(12) United States Patent
Mouazen et al.

(10) Patent No.: US 9,932,478 B2
(45) Date of Patent: Apr. 3, 2018

(54) BITUMINOUS COMPOSITIONS BASED ON PHOSPHORIC DERIVATIVES

(71) Applicant: TOTAL MARKETING SERVICES, Puteaux (FR)

(72) Inventors: Mouhamad Mouazen, Lyons (FR); Romuald Botel, Chonas l'Amballan (FR)

(73) Assignee: TOTAL MARKETING SERVICES, Puteaux (FR)

( * ) Notice: Subject to any disclaimer, the term of this patent is extended or adjusted under 35 U.S.C. 154(b) by 0 days.

(21) Appl. No.: 15/036,161

(22) PCT Filed: Nov. 6, 2014

(86) PCT No.: PCT/EP2014/073869
§ 371 (c)(1),
(2) Date: May 12, 2016

(87) PCT Pub. No.: WO2015/071154
PCT Pub. Date: May 21, 2015

(65) Prior Publication Data
US 2016/0289450 A1 Oct. 6, 2016

(30) Foreign Application Priority Data
Nov. 12, 2013 (FR) ..................... 13 61031

(51) Int. Cl.
| | | |
|---|---|---|
| *C08L 95/00* | (2006.01) | |
| *C04B 26/26* | (2006.01) | |
| *C08L 53/02* | (2006.01) | |
| *E01C 7/18* | (2006.01) | |
| *C04B 40/00* | (2006.01) | |
| *C08K 3/18* | (2006.01) | |
| *C08K 3/32* | (2006.01) | |
| *C04B 111/00* | (2006.01) | |

(52) U.S. Cl.
CPC ............ *C08L 95/00* (2013.01); *C04B 26/26* (2013.01); *C04B 40/0039* (2013.01); *C08K 3/18* (2013.01); *C08K 3/32* (2013.01); *C08L 53/02* (2013.01); *E01C 7/18* (2013.01); *C04B 2111/0062* (2013.01); *C04B 2111/0075* (2013.01); *C08L 2555/32* (2013.01); *C08L 2555/50* (2013.01); *C08L 2555/84* (2013.01)

(58) Field of Classification Search
CPC ................. C04B 26/26; C04B 40/0039
See application file for complete search history.

(56) References Cited

U.S. PATENT DOCUMENTS

| | | | |
|---|---|---|---|
| 2,854,497 A | * | 9/1958 | Piehl ............ C23F 11/04 422/12 |
| 3,751,278 A | | 8/1973 | Alexander |
| RE28,472 E | * | 7/1975 | Aronberg ............ B23K 35/34 148/26 |
| 4,059,218 A | * | 11/1977 | Choby, Jr. .......... B23K 35/3611 148/23 |
| 4,145,322 A | | 3/1979 | Maldonado et al. |
| 4,242,246 A | | 12/1980 | Maldonado et al. |
| 4,554,313 A | | 11/1985 | Hagenbach et al. |
| 4,567,220 A | * | 1/1986 | Schuler ................. C01B 25/37 423/305 |
| 4,567,222 A | | 1/1986 | Hagenbach et al. |
| 5,098,480 A | | 3/1992 | McGinnis et al. |
| 5,120,777 A | | 6/1992 | Chaverot et al. |
| 5,618,862 A | | 4/1997 | Germanaud et al. |
| 5,880,185 A | | 3/1999 | Planche et al. |
| 6,383,464 B1 † | | 5/2002 | Marzari |
| 7,495,045 B2 † | | 2/2009 | Buras |
| 7,998,265 B2 † | | 8/2011 | Buras |
| 8,273,819 B2 † | | 9/2012 | Gauthier |
| 2005/0145137 A1 | | 7/2005 | Buras et al. |
| 2006/0081152 A1 † | | 4/2006 | Buras |
| 2014/0357774 A1 † | | 12/2014 | Schroeder |

FOREIGN PATENT DOCUMENTS

| | | |
|---|---|---|
| AU | 628390 B2 | 9/1992 |
| EP | 0 360 656 A1 | 3/1990 |
| EP | 0 409 683 A1 | 1/1991 |

(Continued)

OTHER PUBLICATIONS

Machine translation of RO-108575-B1. (Year: 1994).*
Amosa et al., "Sulphide Scavengers in Oil and Gas Industry—A Review," NAFTA Scientific Journal, vol. 61, No. 2, pp. 85-92, 2010.
Rands et al., "The Action of Phosphorus on Solutions of Copper Sulphate and Certain Other Metallic Salts," Transaction and Proceedings of the Royal Society of New Zealand 1868-1961, vol. 45, pp. 350-353, 1912.
Mar. 17, 2015 Written Opinion issued in International Application No. PCT/EP2014/073869.
Mar. 17, 2015 International Search Report issued in International Application No. PCT/EP2014/073869.

*Primary Examiner* — Wenwen Cai

(57) ABSTRACT

The invention relates to a package of performance additives for bitumen or bituminous compositions including an acidic adjuvant and a $H_2S$ scavenger chosen from organic or inorganic copper salts. The invention also relates to the use of said $H_2S$ scavenger in order to reduce the $H_2S$ emissions of bitumen or of a bituminous composition treated with the acidic adjuvant. The invention additionally relates to a process for the preparation of a bituminous composition. The preparation process according to the invention makes it possible to obtain bitumen/crosslinked polymer compositions having better mechanical and dynamic properties in comparison with the bitumen/crosslinked polymer compositions of the prior art, while substantially reducing the releases of hydrogen sulfide ($H_2S$).

19 Claims, No Drawings

(56) References Cited

FOREIGN PATENT DOCUMENTS

| | | | |
|---|---|---|---|
| EP | 0 703 949 | B1 | 6/1998 |
| FR | 2 376 188 | A1 | 7/1978 |
| FR | 2 429 241 | A1 | 1/1980 |
| FR | 2 528 439 | A1 | 12/1983 |
| GB | 535062 | A † | 3/1941 |
| RO | 108575 | B1 * | 6/1994 |
| WO | 97/14753 | A1 | 4/1997 |
| WO | 2005/065177 | A2 | 7/2005 |
| WO | 2013/092531 | A1 | 6/2013 |

\* cited by examiner
† cited by third party

BITUMINOUS COMPOSITIONS BASED ON PHOSPHORIC DERIVATIVES

TECHNICAL FIELD

The present invention belongs to the field of bituminous compositions and their performance additives. More specifically, it relates to bituminous compositions comprising phosphoric derivatives and to their process of preparation.

The invention also relates to the use of these bituminous compositions in the fields of road applications, in particular in the manufacture of road binders, such as hot bituminous mixes, cold bituminous mixes, asphalts and surface coatings, and in the fields of industrial applications, for example in the manufacture of internal and external coatings.

PRIOR ART

The use of bitumen in the manufacture of materials for road and industrial applications has been known for a long time: bitumen is the main hydrocarbon binder used in the field of road construction or civil engineering. In order to be able to be used as binder in these different applications, the bitumen has to exhibit certain mechanical and dynamic properties.

In general, conventional bitumens do not simultaneously exhibit all of the required qualities. Bituminous compositions are used in the preparation of binders for various surface coatings and in particular as road surface coatings, provided that these compositions exhibit, in combination, a certain number of mechanical and/or dynamic characteristics. The mechanical properties of bituminous compositions are determined by standardized tests of the different mechanical characteristics, such as the softening point, the penetrability and the rheological characteristics in predetermined tension.

Numerous studies have related to the improvement in the mechanical, elastic and/or rheological properties of bituminous compositions.

It has been known for a long time that the addition of various polymers to these conventional bitumens makes it possible to favorably modify the mechanical properties of the latter and to form bitumen/polymer compositions having mechanical qualities which are improved with respect to those of the bitumens alone.

In addition, it is known that the stability of the bitumen/polymer compositions can be improved by chemical coupling of the polymer to the bitumen. This chemical coupling, conventionally carried out by crosslinking of the polymer, makes it possible in addition to broaden the range of use of the bitumen/polymer compositions. Mention may be made of the documents FR 2 376 188, FR 2 429 241, FR 2 528 439 and EP 0 360 656 as examples of a process involving a random or block copolymer of styrene and of a conjugated diene crosslinked with sulfur. The document FR 2 528 439 relates in particular to crosslinking with a polysulfide. The document EP 0 360 656 describes the use of a sulfur-donating vulcanization accelerator used alone or in combination with chemically non-bonded sulfur and/or a polysulfide or a non-sulfur-donating vulcanization accelerator.

The bitumen/crosslinked polymer compositions thus obtained are known under the acronym "PmB", for Polymer-modified Bitumen, or "PmA", for Polymer-modified Asphalt. For reasons of clarity, we will use only the acronym PmB for the bitumen/crosslinked polymer compositions. The crosslinking of the bitumen/polymer compositions confers on them very good properties in terms of stability on storage, cohesiveness, elongational capability and resistance to aging.

Phosphoric acid and/or polyphosphoric acid has been used since the 1970s to improve the rheological properties of bitumens or bituminous compositions, in particular for increasing their consistency. Mention may be made, by way of example, of the document U.S. Pat. No. 3,751,278, which describes a manufacturing process employing phosphoric acid for increasing the viscosity at high temperature without decreasing the consistency at ambient temperature.

Some acidic adjuvants have also been used to obtain bitumen/polymer compositions having a reinforced multi-grade nature. In patent application EP 703 949, the authors have in addition demonstrated that the mechanical and/or rheological properties could be improved; in particular, the plasticity interval could be widened by using specific acidic inorganic adjuvants. The authors cite in particular phosphoric acids, sulfonic acids, sulfuric acids and their mixtures.

In the document WO9714753, the authors have shown that it is possible to widen the plasticity interval of the bitumen/sulfur-crosslinked polymer compositions by incorporating, in said compositions, an inorganic adjuvant of the acid or acid anhydride type after the phase of crosslinking with sulfur.

Another problem related to the use of bituminous compositions concerns the release of hydrogen sulfide, denoted $H_2S$, during their process of preparation or their use. The emission of $H_2S$ is greater for the bitumen/crosslinked polymer compositions as a result of the use of sulfur-donating crosslinking agent in their process of preparation. Hydrogen sulfide ($H_2S$) is a colorless and toxic gas exhibiting a characteristic odor at a very low concentration. For reasons of safety and of environmental constraints, the reduction, indeed even the suppression, of hydrogen sulfide emissions during the production of bituminous compositions, in particular of bitumen/crosslinked polymer compositions, constitutes an industrial challenge.

Solutions have been provided in the literature for reducing hydrogen sulfide emissions during the manufacture or the use of bituminous compositions. In particular, the addition of an agent capable of trapping hydrogen sulfide ($H_2S$) during the crosslinking of bituminous compositions has been provided in order to overcome this disadvantage. Mention may be made, by way of example, of the organic or inorganic metal salts described in the international application WO2005065177 as capable of trapping $H_2S$. The process employed for reducing the releases of $H_2S$ consists in introducing, into a reactor containing a premixed bitumen/polymer composition, an organic or inorganic metal salt. The metal salt, added in bulk to the reactor, is subsequently stirred in the reactor during the crosslinking reaction.

The applicant company has been interested in the effectiveness of the agents capable of neutralizing and/or trapping $H_2S$ in the processes for the preparation of bituminous compositions, in particular bitumen/crosslinked polymer compositions employing acidic inorganic adjuvants.

The object of the present invention is the improvement in the mechanical and dynamic properties, in particular the plasticity interval, of bituminous compositions, while reducing the risks of $H_2S$ emissions during the preparation and/or the use of such bituminous compositions.

Another object of the invention is to obtain bituminous compositions which release low amounts of $H_2S$, preferably amounts of less then 10 ppm, more preferably of less than or equal to 1 ppm, during the preparation and/or the use (transportation, loading, unloading and storage) of such bituminous compositions, it being understood that the temperatures for preparation and/or use are conventionally between 90° C. and 200° C. and that the content of $H_2S$ is measured according to a conventional method for assaying $H_2S$ in the liquid phase.

The present invention also relates to a process for the preparation of such bituminous compositions.

BRIEF DESCRIPTION

In the context of the preparation of bituminous compositions, the applicant company has discovered that, surprisingly, the use of an acidic adjuvant has a negative effect on the effectiveness of certain agents capable of neutralizing and/or trapping hydrogen sulfide ($H_2S$).

In particular, the applicant company has demonstrated that the acidic adjuvant deactivates said agents capable of neutralizing and/or trapping hydrogen sulfide ($H_2S$).

The applicant company has additionally discovered that the selection of certain specific agents capable of neutralizing and/or trapping hydrogen sulfide ($H_2S$) makes it possible to overcome this disadvantage. The specific combination of an acidic adjuvant and of an agent capable of neutralizing and/or trapping hydrogen sulfide ($H_2S$) makes it possible to obtain a bituminous composition having reduced $H_2S$ emissions while improving the mechanical and/or dynamic properties of said composition. The use of such a combination is particularly advantageous for bitumen/crosslinked polymer compositions.

The applicant company has also discovered that, in order to obtain this combined effect, the agent capable of neutralizing and/or trapping hydrogen sulfide ($H_2S$) and the acidic adjuvant can be used together or successively, the order of introduction having no effect.

For reasons of simplicity, the term "$H_2S$ scavenger" will be used systematically in the continuation of the present patent application to refer to an agent capable of neutralizing and/or trapping hydrogen sulfide ($H_2S$).

Bituminous composition is understood to mean any bitumen composition comprising, in addition to the bitumen, at least one other constituent, for example an elastomer, and/or at least one additive.

According to the invention, the aim of the invention is achieved by a package of performance additives for bitumen or bituminous compositions comprising an acidic adjuvant chosen from phosphoric acids, polyphosphoric acids and their mixtures and a $H_2S$ scavenger chosen from organic or inorganic copper salts.

The $H_2S$ scavenger is advantageously chosen from copper salts from the group consisting of copper oxides, hydroxides, hydrates, carbonates, hydroxy carbonates, carboxylates, nitrates and phosphates and their mixtures.

According to a specific embodiment, the $H_2S$ scavenger is chosen from copper salts from the group consisting of copper oxides, hydroxides, carbonates, hydroxy carbonates and carboxylates and their mixtures.

According to a preferred specific embodiment, the $H_2S$ scavenger is chosen from copper salts from the group consisting of copper oxides, hydroxides, carbonates and hydroxy carbonates and their mixtures.

According to the invention, the aim of the invention is also achieved by the use of a $H_2S$ scavenger in order to reduce the $H_2S$ emissions of bitumen or of a bituminous composition treated with an acidic adjuvant, said $H_2S$ scavenger and said acidic adjuvant being as described above.

According to a specific embodiment, the use of a $H_2S$ scavenger to reduce the $H_2S$ emissions of bitumen or of a bituminous composition treated with an acidic adjuvant is such that the acidic adjuvant and the $H_2S$ scavenger are in the form of a package of additives as described above.

According to the invention, the aim of the invention is also achieved by a process for the preparation of a bituminous composition, in which bitumen, an acidic adjuvant and a $H_2S$ scavenger are brought into contact, the operation being carried out at temperatures of between 90° C. and 200° C., preferably between 120° C. and 200° C. and more preferably between 170° C. and 190° C. and with stirring for a period of time of at least 10 minutes, advantageously of at least 2 hours, preferably between 20 minutes and 6 hours, more preferably between 30 minutes and 2 hours, said $H_2S$ scavenger and said acidic adjuvant being as defined above.

According to a specific embodiment, the proportion of acidic adjuvant is between 0.05% and 15% by weight, preferably between 0.05% and 5% by weight and more preferably between 0.05% and 2% by weight, the percentages by weight being calculated with respect to the total weight of the bituminous composition.

According to another specific embodiment, the proportion of $H_2S$ scavenger is between 0.05% and 5% by weight, preferably between 0.1% and 3% by weight and more preferably between 0.1% and 1% by weight, the percentages by weight being calculated with respect to the total weight of the bituminous composition.

According to an alternative form, the process comprises the heating of the bitumen at a temperature of between 90° C. and 200° C., preferably between 120° C. and 200° C. and more preferably between 170° C. and 190° C., for at least 10 minutes, preferably between 20 minutes and 6 hours and more preferably between 30 minutes and 2 hours, with stirring, followed by the addition of the acidic adjuvant and of the $H_2S$ scavenger, the reaction medium subsequently being maintained at temperature for at least 10 minutes with stirring, preferably between 20 minutes and 6 hours and more preferably between 30 minutes and 2 hours.

Advantageously, the process additionally comprises a stage of addition of 0.5% to 10% by weight, preferably between 1% and 6% by weight and more preferably between 1.5% and 4% by weight of an elastomer, it being understood that the bituminous composition is then a bitumen/polymer composition and that the percentages by weight are calculated with respect to the total weight of the bitumen/polymer composition.

According to a preferred specific embodiment, the elastomer is chosen from sulfur-crosslinkable elastomers and the process additionally comprises a stage of crosslinking of said elastomer by a sulfur-donating coupling agent added in an amount capable of providing from 0.1% to 20% by weight, advantageously from 1% to 10% by weight, preferably from 1% to 6% by weight and more preferably from 2% to 5% by weight of free sulfur with respect to the weight of sulfur-crosslinkable elastomer in said composition, it being understood that the bituminous composition is then a bitumen/crosslinked polymer composition.

The sulfur-donating coupling agent is advantageously chosen from the group consisting of elemental sulfur, hydrocarbyl polysulfides, sulfur-donating vulcanization accelerators and the mixtures of such products with one another and/or with non-sulfur-donating vulcanization accelerators.

According to a preferred alternative form, the elastomer is chosen from random or block copolymers of a monovinylaromatic hydrocarbon and of a conjugated diene.

The elastomer advantageously comprises between 5% and 50% by weight, preferably between 15% and 40% by weight, of monovinylaromatic hydrocarbon.

The elastomer is preferably chosen from random or block copolymers of styrene and of a conjugated diene.

According to a specific development, the weight-average molecular weight of the elastomer is between 10 000 and 600 000 daltons, preferably between 30 000 and 400 000 daltons.

According to the invention, the aim of the invention is also achieved by a bituminous composition capable of being obtained by the preparation process as defined above.

The invention also relates to a bituminous binder comprising a bituminous composition as defined above.

The invention also relates to an asphalt comprising a bituminous binder as described above and inorganic and/or synthetic fillers.

In addition, the invention relates to a bituminous mix comprising a bituminous binder as described above, aggregates and optionally inorganic and/or synthetic fillers.

DETAILED DESCRIPTION

Other advantages and characteristics will emerge more clearly from the description which will follow, the specific embodiments of the invention of which are given as non-limiting examples.

According to a specific embodiment, a package of performance additives comprises an acidic adjuvant and a $H_2S$ scavenger.

Package of additives is understood to mean a composition comprising at least two additives. The package of additives can comprise additives alone or dispersed/dissolved in an inert solvent, in particular of mineral oil type, according to processes well known in the field of additives for bitumen. In the field of additivation, the term "package" is commonly used to identify a composition of additives. The term "concentrate of additives" can also be employed to denote the package of additives, in particular when the latter is provided in the form of a solution.

Performance additives for bitumen or bituminous composition is understood to mean additives which are capable of being incorporated in a bituminous composition, for example in relation to their compatibility, their solubility or their stability in said bitumen or said bituminous composition, and which confer on it improved properties, in comparison with the non-additivated bitumen or bituminous composition. These properties can be mechanical and/or dynamic and/or can relate to environmental and safety problems, for example problems of $H_2S$ emissions.

The acidic adjuvant is preferably chosen from phosphoric acids, polyphosphoric acids and their mixtures.

Various grades of phosphoric acid and/or of polyphosphoric acid comprising different amounts of orthophosphoric acid are commercially available. Commercial phosphoric acids generally comprise from 50% to 200% of orthophosphoric acid.

The term "polyphosphoric acid" refers to concentrated grades of phosphoric acid ($H_3PO_4$) of greater than 95%, generally between 97% and 118%, where the percentage corresponds to the apparent concentration of $H_3PO_4$. Polyphosphoric acid is represented by the formula $H_{n+2}P_nO_{3n+1}$ in which n≥2. Polyphosphoric acid is generally a mixture of pyrophosphoric acid (n=2), triphosphoric acid (n=3) and higher acids (n>3). Phosphoric and polyphosphoric acids can comprise other acids, such as sulfuric acid and/or hydrofluoric acid, as impurities, at concentrations conventionally ranging up to 2%.

The $H_2S$ scavenger is chosen from organic or inorganic copper salts.

A $H_2S$ scavenger will advantageously be chosen from copper salts from the group consisting of copper oxides, hydroxides, hydrates, carbonates, hydroxy carbonates, carboxylates, nitrates and phosphates and their mixtures.

According to a specific embodiment, the $H_2S$ scavenger is chosen from the group consisting of copper oxides, hydroxides, carbonates, hydroxy carbonates and carboxylates and their mixtures.

According to a preferred specific embodiment, the $H_2S$ scavenger is chosen from the group consisting of copper oxides, hydroxides, carbonates and hydroxy carbonates and their mixtures. Copper oxides and hydroxy carbonates are particularly effective.

The ratio by weight of the $H_2S$ scavenger with respect to the acidic adjuvant can advantageously be between 1:300 and 100:1, preferably between 1:10 and 10:1 and more preferably between 1:10 and 5:1.

The package of performance additives can be composed solely of the $H_2S$ scavenger and of the acidic adjuvant, alone or as a mixture in one or more inert solvents, it being understood that said $H_2S$ scavenger and said acidic adjuvant can respectively comprise up to 2% by weight of impurities without, for all that, it being considered that they are not used alone. The solvent has to be inert with respect to the acidic adjuvant and/or the $H_2S$ scavenger.

Generally, the amount of solvent in the package of additives is between 1% and 95%, preferably between 10% and 90%, more preferably between 20% and 80% and more preferably still between 40% and 60% by weight, the percentages by weight being calculated with respect to the total weight of said package of additives.

The inert solvent or solvents will preferably be chosen so as to dissolve both the $H_2S$ scavenger and the acidic adjuvant. For example, the solvent will be chosen from mineral oils.

Preferably, the package of additives is composed solely of the $H_2S$ scavenger and of the acidic adjuvant, the ratio by weight of the $H_2S$ scavenger with respect to the acidic adjuvant being as described above. Such a package of additives is stable on storage and can be added directly during the preparation of the bitumen/crosslinked polymer composition.

The package of additives can be used directly in the treatment of the bitumen or bituminous compositions. In particular, the package of additives can advantageously be used in the process for the preparation of bituminous compositions, preferably of bitumen/polymer compositions and more preferably of bitumen/crosslinked polymer compositions employing a sulfur-donating coupling agent.

According to an alternative form, the $H_2S$ scavenger and the acidic adjuvant as described above can be used separately in the treatment of the bitumen or bituminous compositions, in particular in the preparation of bitumen/polymer compositions and preferably of bitumen/crosslinked polymer compositions employing a sulfur-donating coupling agent.

According to a specific embodiment, a process for the preparation of a bitumen/crosslinked polymer composition comprises a stage of treatment with the acidic adjuvant and the $H_2S$ scavenger described above at a temperature of between 90° C. and 200° C., preferably between 120° C. and 200° C. and more preferably between 170° C. and 190° C., for a period of time of at least 10 minutes, preferably of between 20 minutes and 6 hours and more preferably of between 30 minutes and 2 hours.

According to a specific embodiment, the process for the preparation of a bitumen/crosslinked polymer composition comprises, for example, the following stages:

a bitumen and a sulfur-crosslinkable elastomer are introduced into a reactor, the mixture is stirred until a homogeneous bitumen/elastomer mixture is obtained and is heated at a temperature of between 90° C. and 200° C., preferably between 120° C. and 200° C. and more preferably between 170° C. and 190° C., for a period of time of at least 10 minutes, preferably of between 20 minutes and 6 hours and more preferably of between 1 hour and 5 hours, said elastomer is crosslinked by addition of a sulfur-donating coupling agent to the reaction medium in an amount suitable for providing from 0.1% to 20% by weight, advantageously from 1% to 10% by weight, preferably from 1% to 6% by weight and more preferably from 2% to 5% by weight of free sulfur, with respect to the total weight of the elastomer, while keeping the reaction medium stirred at a temperature of between 90° C. and 200° C., preferably between 120° C. and 200° C. and more preferably between 170° C. and 190° C., for a period of time of at least 10 minutes, preferably of between 20 minutes and 6 hours and more preferably of between 30 minutes and 2 hours, the $H_2S$ scavenger described above is added, the reaction medium being maintained at a temperature of between 90° C. and 200° C., preferably between 120° C. and 200° C. and more preferably between 170° C. and 190° C., for a period of time of at least 10 minutes, preferably of between 20 minutes and 6 hours and more preferably of between 30 minutes and 2 hours, the acidic adjuvant described above is added, the reaction medium being maintained at a temperature of between 90° C. and 200° C., preferably between 120° C. and 200° C. and more preferably between 170° C. and 190° C., for a period of time of at least 10 minutes, preferably of between 20 minutes and 6 hours and more preferably of between 30 minutes and 2 hours.

According to another specific embodiment, the process for the preparation of a bitumen/crosslinked polymer composition comprises, for example, the following stages:

a bitumen and a sulfur-crosslinkable elastomer are introduced into a reactor, the mixture is stirred until a homogeneous bitumen/elastomer mixture is obtained and is heated at a temperature of between 90° C. and 200° C., preferably between 120° C. and 200° C. and more preferably between 170° C. and 190° C., for a period of time of at least 10 minutes, preferably of between 20 minutes and 6 hours and more preferably of between 1 hour and 5 hours, said elastomer is crosslinked by addition of a sulfur-donating coupling agent to the reaction medium in an amount suitable for providing from 0.1% to 20% by weight, advantageously from 1% to 10% by weight, preferably from 1% to 6% by weight and more preferably from 2% to 5% by weight of free sulfur, with respect to the total weight of the elastomer, while keeping the reaction medium stirred at a temperature of between 90° C. and 200° C., preferably between 120° C. and 200° C. and more preferably between 170° C. and 190° C., for a period of time of at least 10 minutes, preferably of between 20 minutes and 6 hours and more preferably of between 30 minutes and 2 hours, the acidic adjuvant and the $H_2S$ scavenger described above are added simultaneously, the reaction medium being maintained at a temperature of between 90° C. and 200° C., preferably between 120° C. and 200° C. and more preferably between 170° C. and 190° C., for a period of time of at least 10 minutes, preferably of between 20 minutes and 6 hours and more preferably of between 30 minutes and 2 hours.

The simultaneous addition of the $H_2S$ scavenger and of the acidic adjuvant has the advantage of reducing the duration of preparation of the bitumen/crosslinked polymer composition and of improving the plasticity interval of said composition. Use may advantageously be made of the package of additives as described above in the stage of simultaneous addition of the acidic adjuvant and of the $H_2S$ scavenger.

For each stage, the temperatures may or may not be identical.

The bitumen according to the present invention can comprise one or more bitumen bases. The bitumen bases can result from different sources. Mention may first of all be made of bitumen bases of natural origin, those present in natural bitumen or natural asphalt deposits or bituminous sands.

The bitumen bases can advantageously originate from the refining of crude oil, preferably from the atmospheric and/or vacuum distillation of oil. The bitumen bases can optionally be blown, visbroken and/or deasphalted.

The bitumen bases can be chosen from bitumens of hard grade or of soft grade.

The different bitumen bases obtained by the refining processes can be combined with one another in order to obtain the best technical compromise.

The bitumen bases used can also be chosen from bitumens fluxed by addition of volatile solvents, of fluxes of petroleum origin and/or of fluxes of plant origin.

The bitumen is advantageously chosen from road bitumens of grades 10/20 to 160/220 and special bitumens of all grades.

The bitumen represents between 90% and 99.3% by weight, preferably between 94% and 99% by weight, of the bitumen/crosslinked polymer composition.

The amount of acidic adjuvant added represents advantageously between 0.05% and 15% by weight, preferably between 0.05% and 5% by weight and more preferably between 0.05% and 2% by weight of the total weight of the bitumen/crosslinked polymer composition.

The amount of $H_2S$ scavenger added represents advantageously between 0.05% and 5% by weight, preferably between 0.1% and 3% by weight and more preferably between 0.1% and 1% by weight of the total weight of the bitumen/crosslinked polymer composition.

In the specific embodiment described above, the acidic adjuvant can be incorporated in the bitumen/crosslinked polymer mixture before or after the $H_2S$ scavenger, it also being possible for a simultaneous incorporation to be envisaged, in particular by addition of a package of additives as described above to the bitumen/crosslinked polymer mixture.

The amount of elastomer introduced into the reactor represents advantageously between 0.5% and 10% by weight, preferably between 1% and 6% by weight and more preferably between 1.5% and 4% by weight of the total weight of the bitumen/crosslinked polymer composition.

The weight-average molecular weight of the elastomer is advantageously between 10 000 and 600 000 daltons, preferably between 30 000 and 400 000 daltons.

The elastomer is preferably chosen from random or block copolymers of a monovinylaromatic hydrocarbon and of a conjugated diene. In particular, the elastomer advantageously comprises between 5% and 50% by weight, preferably between 15% and 40% by weight, of monovinylaromatic hydrocarbon.

The elastomer is advantageously chosen from random or block copolymers of styrene and of a conjugated diene, such as butadiene, isoprene, chloroprene, carboxylated butadiene or carboxylated isoprene. Random or block copolymers of styrene and butadiene will preferably be chosen.

The elastomer can consist of one or more copolymers chosen from block copolymers, with or without a random hinge, of styrene and butadiene, of styrene and isoprene, of styrene and chloroprene, of styrene and carboxylated butadiene or of styrene and carboxylated isoprene.

Preferably, the copolymer of styrene and of conjugated diene is chosen from di- or triblock copolymers of styrene and butadiene, of styrene and isoprene, of styrene and carboxylated butadiene or of styrene and carboxylated isoprene which have styrene contents and weight-average molecular weights lying within the ranges defined above.

According to an alternative form, the elastomer is chosen from random or block copolymers of styrene and butadiene including from 50% to 95% and more particularly from 60% to 95% by weight of units resulting from butadiene. In addition, the proportion of units having a 1,2-double bond resulting from the butadiene can advantageously be between 12% and 50% by weight of said copolymer. The elastomer can, for example, be a styrene/butadiene copolymer of high vinyl type, that is to say having a content of 1,2-double bonds resulting from the butadiene of greater than 20% by weight of said copolymer.

The sulfur-donating coupling agents which can be used are of very varied nature and are chosen as a function of the elastomer to be crosslinked in the bitumen/crosslinked polymer composition.

The sulfur-donating coupling agent is advantageously chosen from the group consisting of elemental sulfur, hydrocarbyl polysulfides, sulfur-donating vulcanization accelerators and the mixtures of such products with one another and/or with non-sulfur-donating vulcanization accelerators.

The elemental sulfur capable of being used to constitute, in part or in all, the crosslinking agent is advantageously flowers of sulfur and preferably crystalline sulfur in the orthorhombic form known under the name of alpha-sulfur.

The vulcanization accelerators are either hydrocarbyl polysulfides or sulfur-donating vulcanization accelerators or non-sulfur-donating vulcanization accelerators. The hydrocarbyl polysulfides can be chosen from those which are defined in the patent FR 2 528 439 cited as example and/or incorporated by reference in the present patent application. The sulfur-donating vulcanization accelerators can be chosen from thiuram polysulfides, such as, for example, tetrabutylthiuram disulfides, tetraethylthiuram disulfides and tetramethylthiuram disulfides. The non-sulfur-donating vulcanization accelerators which can be used can be sulfur-comprising compounds chosen in particular from mercaptobenzothiazole and its derivatives, dithiocarbamates and its derivatives and monosulfides of thiuram and its derivatives.

Mention may be made, for example, of zinc 2-mercaptobenzothiazole, zinc dibutyldithiocarbamate or tetramethylthiuram monosulfide. For further details with regard to the sulfur-donating and non-sulfur-donating vulcanization accelerators which can be used according to the invention, reference may be made to the patents EP 0 360 656, EP 0 409 683 and FR 2 528 439 cited as example and/or incorporated by reference in the present patent application.

Adhesion agents and/or surface-active agents can also be added to the bitumen/crosslinked polymer composition according to any known process. They are generally chosen from alkylamine derivatives, alkylpolyamine derivatives, alkylamidopolyarnine derivatives, alkylamidopolyamine derivatives and derivatives of quaternary ammonium salts, taken alone or as a mixture. The amount of adhesion agents and/or surface-active agents in the bitumen/crosslinked polymer composition is, for example, between 0.2% and 2% by weight, preferably between 0.5% and 1% by weight, with respect to the total weight of the bitumen/crosslinked polymer composition.

The order of introduction of the different constituents does not appear to influence the mechanical and/or dynamic properties of the bitumen/crosslinked polymer composition thus obtained. Nevertheless, it will be preferable to add the elastomer before or at the same time as the sulfur-donating coupling agent for better homogeneity of the composition.

According to an alternative form, the elastomer and the sulfur-donating coupling agent can be introduced simultaneously in the form of a mother solution, according to any known process, during the process for the preparation of the bitumen/crosslinked polymer composition. The mother solution generally comprises a hydrocarbon oil acting as thinning agent, from 5% to 40% by weight of elastomer and from 0.02% to 15% by weight of coupling agent, preferably from 10% to 35% by weight of elastomer and from 0.1% to 5% by weight of coupling agent.

The bitumen/crosslinked polymer compositions can be used as is or else diluted, according to any known process, with variable proportions of bitumen or of a composition according to the invention having different characteristics, in order to form bitumen/polymer binders having a chosen content of crosslinked elastomer which can either be equal to (undiluted composition) or else less (diluted composition) than the content of crosslinked elastomer of the corresponding initial bitumen/polymer compositions.

Generally, the diluting of the bitumen/crosslinked polymer compositions can be carried out either directly subsequent to the obtaining of said compositions, when a virtually immediate use of the resulting bitumen/polymer binders is required, or else after a more or less prolonged duration of storage of the bitumen/crosslinked polymer compositions, when a delayed use of the resulting bitumen/polymer binders is envisaged. The bitumen for the diluting of a bitumen/crosslinked polymer composition according to the invention can be chosen from the bitumens described above. If appropriate, the bitumen used for the diluting may have been itself pretreated with an acidic adjuvant and/or a $H_2S$ scavenger according to the invention.

The bitumen/crosslinked polymer compositions obtained by the preparation process described above have improved mechanical and dynamic properties, in particular a reinforced multigrade nature. Reinforced multigrade nature is understood to mean the fact that these bitumen/crosslinked polymer compositions exhibit a broad plasticity interval. Said interval is defined as the difference between the ring-and-ball softening temperature, which reveals the properties under hot conditions of the binder or bitumen/polymer composition, and the Fraass breaking point, which reveals the properties under cold conditions of the bitumen/crosslinked polymer composition. The bituminous binder consisting of/or based on the bitumen/crosslinked polymer composition will show better resistance to the stresses under hot conditions and under cold conditions as the plasticity interval widens.

More generally, the bituminous compositions obtained by the preparation process according to the present invention exhibit improved mechanical and dynamic properties, in particular a better consistency, with a lower needle penetrability at 25° C. and/or a higher ring-and-ball temperature.

In addition, at the temperatures of preparation and/or of use (transportation, loading, unloading and storage) conventionally of between 90° C. and 200° C., the $H_2S$ emissions originating from the bituminous compositions, in particular from the bitumen/crosslinked polymer compositions according to the invention, are greatly reduced. The content of $H_2S$ emitted is in particular less then 10 ppm, more preferably less than or equal to 1 ppm, the content of $H_2S$ being measured according to a conventional method for the assaying of $H_2S$ in the liquid phase.

Various uses of the bituminous compositions obtained according to the invention are envisaged. In particular, the bituminous compositions, in particular the bitumen/polymer compositions and the bitumen/crosslinked polymer compositions, according to the invention can be used in the preparation of bituminous binders.

According to a specific embodiment, a bituminous binder comprises a bituminous composition as described above.

The bituminous binder according to the invention can in its turn be employed to prepare a combination with aggregates, in particular road aggregates.

As regards the road applications, the invention is targeted in particular at bituminous mixes as materials for the construction and the maintenance of road foundations and their surfacing, and also in carrying out all road works.

Bituminous mix is understood to mean a mixture of a bituminous binder with aggregates and optionally inorganic and/or synthetic fillers.

The bituminous mix comprises a bituminous binder as described above and optionally inorganic and/or synthetic fillers, preferably chosen from fines, sand, stone chips and recycled milled products. The aggregates are inorganic and/or synthetic aggregates, in particular recycled milled products, with dimensions of greater than 2 mm, preferably of between 2 mm and 20 mm.

The bituminous binder described above can advantageously be used to prepare a surface coating, a hot bituminous mix, a cold bituminous mix, a cold-poured bituminous mix or a grave emulsion.

As regards the road applications, the invention is also targeted at asphalts as materials for constructing and covering sidewalks.

Asphalt is understood to mean a mixture of bituminous binder with inorganic and/or synthetic fillers.

An asphalt comprises a bituminous binder as described above and inorganic fillers, such as fines, sand or stone chips, and/or synthetic fillers. The inorganic fillers are composed of fines (particles with dimensions of less than 0.063 mm), of sand (particles with dimensions of between 0.063 mm and 2 mm) and optionally of stone chips (particles with dimensions of greater than 2 mm, preferably of between 2 mm and 4 mm).

The asphalts exhibit 100% compactness and are mainly used to construct and cover sidewalks, whereas the mixes have a compactness of less than 100% and are used to construct roads. Unlike the mixes, the asphalts are not compacted with a roller when being put in place.

Another aspect of the invention is the use of a bituminous composition, preferably a bitumen/crosslinked polymer composition, in various industrial applications, in particular for preparing a leaktight coating, a membrane or a seal coat.

As regards the industrial applications of the bituminous compositions, mention may be made of the preparation of leaktight membranes, of noise-reduction membranes, of insulating membranes, of surface coatings, of carpet tiles or of seal coats.

EXAMPLES

The invention is illustrated by the following examples, given without implied limitation.

In these examples, the amounts and percentages are expressed by weight, unless otherwise indicated.

For the record, throughout the present patent application, the following properties of the bitumens are measured as shown in table 1 below:

TABLE 1

| Property | Abbreviation | Unit | Measurement standard |
|---|---|---|---|
| Needle penetrability at 25° C. | P25 | 1/10 mm | EN 1426 |
| Ring-and-ball softening temperature | RBT | ° C. | EN 1427 |
| Fraass breaking point | Fraass | ° C. | EN 12593 |

Bitumen

The bitumen used results from vacuum residues from the direct distillation of crude oil. The bitumen has a P25 of 43 1/10 mm.

Elastomer

Styrene/butadiene/styrene block copolymer, comprising 30.5% by weight of styrene and comprising 69.5% by weight of butadiene. The content of 1,2-vinyl groups is 27.8% by weight, with respect to the total weight of copolymer. The copolymer has a weight-average molecular weight (Mw) of 142 500 daltons and a polydispersity index $I_p$ of 1.09.

Acidic Adjuvant

115% Polyphosphoric acid, denoted PPA; CAS No. 8017-16-1.

Sulfur-Donating Coupling Agent

Flowers of sulfur; CAS No. 7704-34-9.

Scavenger

The characteristics of the different scavengers $S_x$ tested are listed in the following table 2:

TABLE 2

| Reference of the scavenger $S_x$ | Product | Trade name/Supplier | CAS No. |
|---|---|---|---|
| $S_1$ | Zinc carboxylate | Nalco | |
| $S_2$ | Copper(II) hydroxy carbonate | Merck | 12069-69-1 |
| $S_3$ | Magnesium hydroxy carbonate | VWR International | 12125-28-9 |
| $S_4$ | Calcium carbonate | Sigma-Aldrich | 471-34-1 |
| $S_5$ | Zinc oxide | VWR International | 1314-13-2 |
| $S_6$ | Calcium oxide | Aldrich | 1305-78-8 |
| $S_7$ | Magnesium oxide | VWR International | 1309-48-4 |
| $S_8$ | Copper(II) oxide | VWR International | 1317-38-0 |

Bitumen/Crosslinked Polymer Compositions $C_1$ to $C_8$

The bitumen/crosslinked polymer compositions $C_1$ to $C_8$ are prepared according to a preparation process employing the following three stages:

First Stage: Preparation of the Bitumen/Crosslinked Polymer Compositions Without PPA: $C°_1$ to $C°_9$ The following are introduced into the reactor:
97.71% by weight of the bitumen,
2.22% by weight of the elastomer.

The mixture is stirred at high intensity, that is to say at a high shear rate, in order to obtain a mixture which is homogeneous at the micron scale, and is heated at 185° C. for approximately 4 hours.

0.07% by weight of the sulfur-donating coupling agent is subsequently added.

The mixture is stirred at low intensity and is heated at 185° C. for 2 hours.

The percentages of each of the constituents are calculated with respect to the weight of the bitumen/crosslinked polymer composition resulting from the first stage.

Second Stage: Treatment of the $H_2S$ Emissions in Order to Obtain Bitumen/Crosslinked Polymer Compositions without PPA but with Scavenger $C^s_1$ to $C^s_9$ The second stage consists in adding 0.2% by weight of the scavenger $S_x$. The scavenger $S_x$ is introduced into the reactor and then the mixture is stirred while maintaining the temperature at 185° C. for 20 minutes. The percentage of scavenger $S_x$ is calculated with respect to the weight of the bitumen/crosslinked polymer composition resulting from the second stage.

For the compositions $C^s_1$ to $C^s_8$, the scavenger $S_x$ was added directly to the reactor, without predissolution.

For the composition $C^s_9$, the scavenger $S_2$ was added as a 20% by weight solution in a mineral oil.

Third Stage: Acid Treatment with PPA in Order to Obtain Bitumen/Crosslinked Polymer Compositions with PPA and Scavenger: $C_1$ to $C_8$ The third stage consists in adding 0.8% by weight of PPA to the reaction medium. The PPA is introduced into the reactor and then the mixture is stirred while maintaining the temperature at 185° C. for 30 minutes. The percentage of PPA is calculated with respect to the weight of the bitumen/crosslinked polymer composition resulting from the third stage.

The amounts used are as follows: 967.3 g of bitumen, 22 g of the elastomer, 0.7 g of sulfur, 2 g of scavenger $S_x$, and 8 g of PPA.

Measurement of the $H_2S$ Emissions

The measurement of the $H_2S$ emissions is carried out according to a conventional method for assaying $H_2S$. The measurement of the $H_2S$ emissions consists in sparging gaseous nitrogen into the bitumen/crosslinked polymer composition to be tested, maintained at 185° C., followed by the measurement of the content of $H_2S$ trapped in the gaseous nitrogen by means of a $H_2S$ gas detector. The calculation of the concentration of $H_2S$ in the liquid phase is based on the initial weight of the bitumen/crosslinked polymer composition tested.

This measurement does not have the purpose of being representative of the content of $H_2S$ present in the gaseous headspace in real time but has the aim of comparing the effectiveness of the scavengers used under identical conditions, by determining the presence or the absence of a release of $H_2S$. Thus, we have set a limiting threshold for release of $H_2S$ above which we consider that the effectiveness of the scavenger is insufficient. This method makes it possible, in addition, to demonstrate the phenomenon of deactivation of certain scavengers in the presence of an acidic adjuvant.

The measurement of the $H_2S$ emissions is carried out after each of the three stages described above. The results are listed in table 3 below.

TABLE 3

| PmB | | PmB + $S_x$ | | PmB + $S_x$ + PPA | |
|---|---|---|---|---|---|
| $C°_x$ | $H_2S$ (ppm) | $C^s_x$ | $H_2S$ (ppm) | $C_x$ | $H_2S$ (ppm) |
| $C°_1$ | >100 | $C^s_1$ | <1* | $C_1$ | >100 |
| $C°_2$ | >100 | $C^s_2$ | <1* | $C_2$ | <1* |
| $C°_3$ | >100 | $C^s_3$ | >100 | $C_3$ | >100 |
| $C°_4$ | >100 | $C^s_4$ | >100 | $C_4$ | >100 |
| $C°_5$ | >100 | $C^s_5$ | >100 | $C_5$ | >100 |
| $C°_6$ | >100 | $C^s_6$ | >100 | $C_6$ | >100 |
| $C°_7$ | >100 | $C^s_7$ | >100 | $C_7$ | >100 |
| $C°_8$ | >100 | $C^s_8$ | <1* | $C_8$ | <1* |
| $C°_9$ | >100 | $C^s_9$ | <1* | $C_9$ | <1* |

*detection limit of the $H_2S$ gas detector

In the light of the results gathered together in table 3, the following comments may be made:

During the first stage of the process for the preparation of the bitumen/polymer composition $C°_x$, the crosslinking with sulfur of the elastomer is accompanied by a release of $H_2S$. The contents of $H_2S$ measured exceed the limiting threshold of 100 ppm.

During the treatment of the second stage, the scavengers $S_1$ to $S_8$ can be differentiated according to their effectiveness in trapping and/or neutralizing the $H_2S$. For the bitumen/crosslinked polymer composition $C^s_3$, $C^s_4$, $C^s_5$, $C^s_6$ or $C^s_7$, the addition, respectively, of 0.2% by weight of the scavenger $S_3$, $S_4$, $S_5$, $S_6$ or $S_7$ is not sufficient to reduce the release of $H_2S$ to a content of less than 100 ppm. The scavengers $S_3$, $S_4$, $S_5$, $S_6$ and $S_7$ consequently prove to be scavengers which are relatively ineffective in reducing $H_2S$ emissions in bitumen/crosslinked polymer compositions.

On the other hand, the scavengers $S_1$, $S_2$ and $S_8$ are particularly effective. Success is achieved in reducing the $H_2S$ emissions of the bitumen/crosslinked polymer compositions $C^s_1$, $C^s_2$ and $C^s_8$ down to a content below the detection limit of the $H_2S$ gas detector (1 ppm).

Furthermore, it is noticed that the addition of the scavenger $S_2$ in solution in a mineral oil does not damage the effectiveness of said scavenger in reducing the $H_2S$ emissions of the bitumen/crosslinked polymer composition $C^s_9$.

During the acid treatment of the third stage, the measured content of $H_2S$ in the bitumen/crosslinked polymer composition $C_1$ is, surprisingly, markedly greater than the limiting threshold of 100 ppm, whereas the measurement carried out after the second stage on the bitumen/crosslinked polymer composition $C^s_1$ had revealed virtually no presence of $H_2S$ (<1 ppm). This increase in the content of $H_2S$ before and after the third stage (20 min after the introduction of the PPA) reflects a phenomenon of release of $H_2S$ responsible for the deactivation of the scavenger $S_1$.

In addition, this phenomenon of release of $H_2S$ is also observed for the bitumen/crosslinked polymer compositions $C^s_3$, $C^s_5$ and $C^s_6$ respectively comprising the scavengers $S_3$, $S_5$ and $S_6$. This is because a significant increase in the content of $H_2S$ ($\Delta H_2S \geq 100$ ppm) is observed before and after the third stage (30 min after the introduction of the PPA).

Thus, the results demonstrate that the addition of PPA deactivates the scavengers $S_1$, $S_3$, $S_5$ and $S_6$ and produces a phenomenon of release of $H_2S$ in the bitumen/crosslinked polymer compositions $C_1$, $C_3$, $C_5$ and $C_6$.

For the bitumen/crosslinked polymer compositions $C^s_4$ and $C^s_7$ respectively comprising the scavengers $S_4$ and $S_7$, it is not possible to go by these measurements in ruling on the presence of a phenomenon of deactivation of the scavenger by the PPA insofar as the scavengers $S_4$ and $S_7$ are not effective enough as $H_2S$ scavenger.

The effectiveness of the scavengers $S_2$ and $S_8$ is particularly noteworthy in the presence of PPA since success is achieved in suppressing virtually all of the $H_2S$ emissions in the bitumen/crosslinked polymer compositions $C_2$ and $C_8$.

In addition, the presence of PPA does not damage the effectiveness of the scavengers $S_2$ and $S_8$ as a phenomenon of release of $H_2S$ in the bitumen/crosslinked polymer compositions $C_2$ and $C_8$ is not observed. The scavengers $S_2$ and $S_8$ are thus compatible with an acid treatment of bitumen/crosslinked polymer composition, in particular a treatment with PPA.

Furthermore, the effectiveness of the scavenger $S_2$ is maintained after treatment with PPA when said scavenger is added in solution in a mineral oil (bitumen/crosslinked polymer composition $C_9$).

In conclusion, the inorganic or organic copper salts are particularly effective in comparison with the other inorganic or organic metal salts as $H_2S$ scavenger of bitumen/crosslinked polymer compositions employing an acid treatment, in particular a treatment with PPA.

Properties of the Bitumen/Crosslinked Polymer Compositions

The characteristics of the different bitumen/crosslinked polymer compositions, measured according to the above-mentioned standards, are recorded in the following table 4:

TABLE 4

| | Bitumen/crosslinked polymer composition | | | |
|---|---|---|---|---|
| | $C^s_1$ | $C_1$ | $C_2$ | $C_8$ |
| $H_2S$ scavenger | $S_1$ | $S_1$ | $S_2$ | $S_8$ |
| PPA presence yes/no | no | yes | yes | yes |
| P25 (1/10 mm) | 34 | 31 | 27 | 28 |
| RBT (° C.) | 62 | 65.4 | 68.4 | 66.8 |
| Fraass (° C.) | −8 | −12 | −10 | −9 |
| Plasticity interval (ΔRBT − Fraass) | 70 | 77.4 | 78.4 | 75.8 |

The comparison of the RBT and Fraass results of the bitumen/crosslinked polymer compositions $C^s_1$ and $C_1$ confirms the increase in the plasticity interval due to the acid treatment with PPA described in the prior art.

The use of the scavengers $S_2$ and $S_8$ according to the present invention does not affect the effect of the acid treatment on the mechanical and dynamic properties of the bitumen/crosslinked polymer composition, in particular on the plasticity interval. On the contrary, the bitumen/crosslinked polymer composition $C_2$ has a plasticity interval widened in comparison with that of the bitumen/crosslinked polymer composition $C_1$. With regard to the plasticity interval of the composition $C_8$, it remains comparable to that of the composition $C_1$.

Use of a Package of $H_2S$ Scavenger/Acidic Adjuvant Additives: Effect on the $H_2S$ Emissions and on the Properties of the Bitumen/Crosslinked Polymer Compositions Preparation of the Packages of Additives $P_2$ and $P_8$:

Two packages of additives $P_2$ and $P_5$ are prepared by mixing 20% by weight of scavenger $S_2$ (package $P_2$) or $S_8$ (package $P_8$) and 80% by weight of PPA. The scavengers $S_2$ and $S_8$ are soluble in the PPA and the packages of additives $P_2$ and $P_8$ are provided in the form of a homogeneous solution.

Preparation of the Bitumen/Crosslink Polymer Compositions $C'_2$ and $C'_8$:

Bitumen/crosslinked polymer compositions $C'_2$ and $C'_8$ were prepared by respectively adding the package of additives $P_2$ (composition $C'_2$) or $P_8$ (composition $C'_8$) to the bitumen/crosslinked polymer composition $C°_2$ or $C°_8$ obtained on conclusion of the first stage as described above.

Measurement of the $H_2S$ Emissions:

The measurement of the $H_2S$ emissions is carried out after the preparation of the bitumen/crosslinked polymer composition (first stage) and after the addition of the package of additives. The results are listed in table 5 below.

TABLE 5

| PmB | | PmB + Package of additives | |
|---|---|---|---|
| $C°_x$ | $H_2S$ (ppm) | $C_x$ | $H_2S$ (ppm) |
| $C°_2$ | >100 | $C'_2$ | <1* |
| $C°_8$ | >100 | $C'_8$ | <1* |

In the light of the preceding results, it is noticed that the addition of the package of additives $P_2$ or $P_8$ on conclusion of the first stage of the process for the preparation of the bitumen/crosslinked polymer composition $C°_2$ or $C°_8$ does not damage the effectiveness of the scavenger in trapping the $H_2S$ emissions. This is because a phenomenon of release of $H_2S$ in the bitumen/crosslinked polymer compositions $C'_2$ and $C'_8$ is not observed. The scavengers $S_2$ and $S_8$, and the PPA can thus be introduced all at once in the form of a package of additives, which makes it possible to shorten the duration of preparation of a bitumen/crosslinked polymer composition while reducing the $H_2S$ emissions.

Properties of the Bitumen/Crosslinked Polymer Compositions:

The characteristics of the different bitumen/crosslinked polymer compositions, measured according to the above-mentioned standards, are listed in the following table 6:

TABLE 6

| | Bitumen/crosslinked polymer composition | | | | |
|---|---|---|---|---|---|
| | $C_1$ | $C_2$ | $C_8$ | $C'_2$ | $C'_8$ |
| $H_2S$ scavenger | $S_1$ | $S_2$ | $S_8$ | $S_2$ | $S_8$ |
| PPA presence yes/no | yes | yes | yes | yes | yes |
| P25 (1/10 mm) | 31 | 27 | 28 | 23 | 22 |
| RBT (° C.) | 65.4 | 68.4 | 66.8 | 71 | 70.4 |
| Fraass (° C.) | −12 | −10 | −9 | −10 | −10 |
| Plasticity interval (ΔRBT − Fraass) | 77.4 | 78.4 | 75.8 | 81 | 80.4 |

The addition of the package of additives $P_2$ or $P_8$ does not affect the effect of the acid treatment on the mechanical and dynamic properties of the bitumen/crosslinked polymer composition, in particular on the plasticity interval. On the contrary, the bitumen/crosslinked polymer compositions $C'_2$ and $C'_8$ have a plasticity interval widened in comparison with that of the bitumen/crosslinked polymer composition $C_1$.

In conclusion, the process for the preparation of the bitumen/crosslinked polymer compositions according to the invention makes it possible to substantially reduce the releases of hydrogen sulfide (H₂S) in the presence of an acidic adjuvant, while having mechanical and dynamic properties comparable to those of the bitumen/crosslinked polymer compositions of the prior art.

The invention claimed is:

1. A package comprising:
   bitumen or a bituminous composition,
   an acidic adjuvant selected from the group consisting of phosphoric acids, polyphosphoric acids, and their mixtures, and
   a H₂S scavenger comprising copper (II) hydroxy carbonate $Cu_2(OH)_2CO_3$.

2. The package as claimed in claim 1, wherein a ratio by weight of the H₂S scavenger with respect to the acidic adjuvant is between 1:300 and 100:1.

3. The package as claimed in claim 2, wherein the ratio by weight of the H₂S scavenger with respect to the acidic adjuvant is between 1:10 and 10:1.

4. The package as claimed in claim 3, wherein the ratio by weight of the H₂S scavenger with respect to the acidic adjuvant is between 1:10 and 5:1.

5. The package as claimed in claim 1, further comprising one or more inert solvents.

6. The package as claimed in claim 5, wherein the solvent is a mineral oil.

7. The package as claimed in claim 5, wherein an amount of solvent is between 1% and 95% by weight, with respect to the total weight of the acidic adjuvant and the H₂S scavenger.

8. The package as claimed in claim 7, wherein the amount of solvent is between 10% and 90% by weight, with respect to the total weight of the acidic adjuvant and the H₂S scavenger.

9. The package as claimed in claim 8, wherein the amount of solvent is between 20% and 80% by weight, with respect to the total weight of the acidic adjuvant and the H₂S scavenger.

10. The package as claimed in claim 9, wherein the amount of solvent is between 40% and 60% by weight, with respect to the total weight of the acidic adjuvant and the H₂S scavenger.

11. The package as claimed in claim 1, wherein the package consists of the bitumen or the bituminous composition, the H₂S scavenger, and the acidic adjuvant.

12. The package as claimed in claim 1, wherein the bitumen or the bituminous composition, the acidic adjuvant, and the H₂S scavenger are packed separately.

13. The package as claimed in claim 1, which further comprises at least one H₂S scavenger selected from the group consisting of copper oxides, copper hydroxides, copper hydrates, copper carbonates, copper carboxylates, copper nitrates, copper phosphates and their mixtures.

14. A process for preparation of a bitumen or a bituminous composition, said process comprising a stage of treatment of a bitumen or a bituminous composition with:
   a H₂S scavenger selected from the group consisting of copper (II) hydroxyl carbonates and their mixtures with a copper compound, wherein the copper compound is selected from the group consisting of copper oxides, copper hydroxides, copper hydrates, copper carbonates, copper carboxylates, copper nitrates, copper phosphates and their mixtures, and
   an acidic adjuvant chosen from phosphoric acids, polyphosphoric acids and their mixtures.

15. The process as claimed in claim 14, wherein the H₂S scavenger and the acidic adjuvant are used separately.

16. The process as claimed in claim 14, wherein the H₂S scavenger and the acidic adjuvant are directly added to the bitumen or bituminous composition in the form of a package of additives.

17. A process for preparation of a bitumen/crosslinked polymer composition comprising employing a sulfur-donating coupling agent and a stage of treatment of a bitumen or a bituminous composition with:
   a H₂S scavenger selected from the group consisting of copper (II) hydroxyl carbonates and their mixtures with a copper compound, wherein the copper compound is selected from the group consisting of copper oxides, copper hydroxides, copper hydrates, copper carbonates, copper carboxylates, copper nitrates, copper phosphates and their mixtures, and
   an acidic adjuvant chosen from phosphoric acids, polyphosphoric acids and their mixtures.

18. The process as claimed in claim 17, wherein the proportion of H₂S scavenger is between 0.05% and 5% by weight, the percentages being calculated with respect to the total weight of the bitumen/crosslinked polymer composition.

19. The process as claimed in claim 17, wherein the proportion of acidic adjuvant is between 0.05% and 15% by weight, the percentages by weight being calculated with respect to the total weight of the bitumen/crosslinked polymer composition.

* * * * *